United States Patent
Jiang

(10) Patent No.: US 9,652,694 B2
(45) Date of Patent: May 16, 2017

(54) OBJECT DETECTION METHOD, OBJECT DETECTION DEVICE, AND IMAGE PICKUP DEVICE

(71) Applicant: CANON KABUSHIKI KAISHA, Tokyo (JP)

(72) Inventor: Yong Jiang, Beijing (CN)

(73) Assignee: CANON KABUSHIKI KAISHA, Tokyo (JP)

( * ) Notice: Subject to any disclaimer, the term of this patent is extended or adjusted under 35 U.S.C. 154(b) by 172 days.

(21) Appl. No.: 14/461,911

(22) Filed: Aug. 18, 2014

(65) Prior Publication Data

US 2015/0054824 A1 Feb. 26, 2015

(30) Foreign Application Priority Data

Aug. 21, 2013 (CN) .......................... 2013 1 0365300

(51) Int. Cl.
*G06T 17/00* (2006.01)
*G06K 9/62* (2006.01)

(52) U.S. Cl.
CPC ......... *G06K 9/6284* (2013.01); *G06K 9/6256* (2013.01)

(58) Field of Classification Search
None
See application file for complete search history.

(56) References Cited

U.S. PATENT DOCUMENTS 7,526,101 B2  4/2009  Avidan
8,385,632 B2  2/2013  Porikli
2011/0158535 A1*  6/2011  Iio .................. G06K 9/4642
                                              382/190
2013/0039409 A1*  2/2013  Gupta .............. G06K 9/00771
                                              375/240.02

FOREIGN PATENT DOCUMENTS

CN           101216942 A       7/2008

OTHER PUBLICATIONS

Sanchez-Hernandez et al. (One-class classification for mapping a specific land-cover class: SVDD classification of Fenland, vol. 45, No. 4, Apr. 2007, IEEE).*

* cited by examiner

*Primary Examiner* — Kyle Zhai
(74) *Attorney, Agent, or Firm* — Canon U.S.A., Inc. IP Division

(57) ABSTRACT

An object detection device comprises a specific object detector configured to detect a specific object in an image, a scene model creation unit configured to create a scene model characterizing a background of the specific object in the image, and a filtering unit configured to filter object detection results of the specific object detector using the scene model to determine the specific object, wherein the scene model creation unit comprises a collection unit configured to collect regions other than the specific object to be detected from the image as samples, a feature extraction unit configured to extract first negative feature vectors from the samples, a clustering unit configured to cluster first negative feature vectors into a plurality of feature groups, and a classifier creation unit configured to create first classifiers each for respective one of the feature groups and to create the scene model by combining the first classifiers.

15 Claims, 9 Drawing Sheets

PRIOR ART

OBJECT DETECTION METHOD, OBJECT DETECTION DEVICE, AND IMAGE PICKUP DEVICE

BACKGROUND OF THE INVENTION

Field of the Invention

The present invention relates to an object detection method, an object detection device for detecting a specific object and an image pickup device including the object detection device.

Description of the Related Art

Analysis of objects in images is important in the fields of image processing, computer vision, pattern recognition and the like and more and more attention has been attracted onto the detection of an object. Two steps are generally involved in object detection technique, that is, a training step and a detection step. During the training step, a classifier is obtained by training with several samples of an object. Then, during the detection step, the classifier thus obtained is used to detect the object.

Detection of a specific object such as a face, people, a car and etc has made great progress in recent years. If generic classifiers or object detectors which are trained with a large quantity of samples offline by using the above object detection technique are used to detect the specific object in any images or video sequences, it is likely to fail and often suffer high false alarms.

In this case, scene information is very important to improve the generic detector's discrimination and reduce false alarms. Recently, to overcome these problems, some scene modelling methods are proposed in which a scene model is created using specific scene information such as the object instances, background and context. Thus, more accuracy detection results can be gotten by said scene model, allowing adapting to the changing environment and said scene model being widely used for surveillance and tracking.

The main purpose of said scene model is try to get more accuracy detection results and thus said scene model is more effective classifier in corresponding specific scene. The existing scene models are characterized by:

Binary classifier: for distinguishing a specific object and a non-specific object;

Collecting both of positive samples (object used for training) and negative samples (specific scene without the object) repeatedly: for training and updating a binary classifier repeatedly.

FIG. 1 shows a flowchart of an object detection method in the prior art with the main steps as follow:

1) Collecting positive samples S101: user drawing a window for an object in the preceding frame or frames of a video as a positive sample, or using a current object detector to detect a window for the object as a positive sample;

2) Collecting negative samples S102: collecting some windows as negative samples which are not user drawn windows or detected windows by the current object detector;

3) Learning a new classifier 5103: learning a new binary classifier which can distinguish the object from a specific scene more effectively using the collected positive and negative samples;

4) Object detection S104: detecting the object from sequent frames by said new binary classifier and updating said classifier by repeating the above steps according to the detection results until the resultant classifier has a false alarm lower than a certain threshold, as shown by the dotted line in FIG. 1. Such method can be used for tracking by object detection and only is used for videos or sequent frames.

For example, U.S. Pat. No. 8,385,632 proposes a method in which a trained generic classifier is adapted to detect an object from a specific scene. Since the specific scene is unknown when the generic classifier is trained using generic training data, it is likely to result in high false alarm in the case that the generic classifier is directly used to detect the object from an image comprising the specific scene, as shown in FIG. 1B of this document. Therefore, it is necessary to keep the information of the previous training examples on the one hand, and to collect repeatedly positive or negative samples related to the classification task with respect to the specific scene on the other hand so as to create a classifier specific to the specific scene based on the generic classifier repeatedly, as shown in FIG. 2 of this document. However, it is necessary for such method to keep the generic training data for the generic classifier while collecting new positive and negative samples to thereby update the generic classifier repeatedly with the generic training data as well as the collected positive and negative samples.

U.S. Pat. No. 7,526,101 proposes a method for tracking an object in a video. It treats object tracking as a binary classification problem. First, it trains in real time based on the acquired video a set of weak classifiers used for distinguishing the object and background. Second, it combines the set of weak classifiers into a strong classifier which can generate a confidence map for a frame so as to distinguish the object and background. However, in this method each weak classifier is trained based on the respective positive and negative samples in individual frames and in the case that the frames vary as a function of time it is necessary to train repeatedly new weak classifiers so as to replace the old ones of the set of weak classifiers. Accordingly, the strong classifier is updated to thereby adapt to the variation of frames with time.

CN patent publication No. 101216942A provides a background modelling method which enables online updates. But on the one hand this method has to update online and on the other hand this background model is not based on a classifier but based on a template or mask image, and is used to divide foreground and background image by frame subtraction.

Although the above method can improve detection accuracy in the case of a specific scene, but also has the following problem:

1) A new binary classifier is always created by positive samples, for example, samples given by user, samples of the detected result by a current object detector, and negative samples.

2) The positive and negative samples need to be in large quantity. Negative samples are easy to be collected from scene frames or videos, while positive samples are very difficult to be collected because good positive samples needs to satisfy many criteria, such as quantity, size, clarity, integrity, uniqueness and orientation and thus it is not possible to accurately and efficiently provide the required multiple positive samples by conventional ways. So the scene models used in the existing detection methods are only learned by a few of positive and negative samples firstly, and waits for update with more positive and negative samples in the future;

3) The scene model learned by a few positive and negative samples is always too weak to be used for object detection directly. So this scene model is only suitable to object tracking, i.e., detecting the target near the position of the target in last frame, and updating the scene model by detected target.

It can be seen that there is an issue in the prior art in which the positive samples for training the classifiers have to be collected repeatedly in order to improve the accuracy of the specific object detection.

SUMMARY OF THE INVENTION

One of the objects of the application is that the accuracy of the specific object detection may be improved without collecting any positive sample. Further, the object in which the efficiency of the specific object detection is improved can be achieved by eliminating the complicated process in which the positive samples are collected.

According to an aspect of the present invention, an object detection device comprises a specific object detector configured to detect a specific object in an image, a scene model creation unit configured to create a scene model characterizing a background of the specific object in the image, and a filtering unit configured to filter object detection results of the specific object detector using the scene model to determine the specific object, wherein the scene model creation unit comprises a collection unit configured to collect regions other than the specific object to be detected from the image as samples, a feature extraction unit configured to extract first negative feature vectors from the samples, a clustering unit configured to cluster first negative feature vectors into a plurality of feature groups, and a classifier creation unit configured to create first classifiers each for respective one of the plurality of feature groups and to create the scene model by combining the first classifiers.

Further features of the present invention will become apparent from the following description of exemplary embodiments with reference to the attached drawings.

BRIEF DESCRIPTION OF THE DRAWINGS

The above and more objects and advantages of the present application will be further described in combination with the specific embodiments with reference to the accompanying drawings. In these drawings, identical or corresponding technical features or components will be represented by identical or corresponding reference numerals.

DESCRIPTION OF THE EMBODIMENTS

The exemplary embodiments of the application will be described in conjunction with the appended drawings hereinafter. For clarity and simplicity, not all of the features of the embodiments are described in the description. However, it will be understood that various embodiment-specific settings have to be made in the process of implementing the embodiments, so as to achieve the specific goals of the developers, for example, those constraint conditions related to system and service, and those constraint conditions may be varied between embodiments. Further, it shall also be understood that although development effort may be very complex and time-consuming, such development effort is merely routine task for those skilled in the art benefiting from the teaching of the disclosure.

Herein, it is also to be noted, in order to avoid obscuring the application by unnecessary details, only process steps and/or system structures closely related to the solutions at least in accordance with the application are illustrated in the accompany drawings, and other details with less relationship to the application will be omitted.

Figure 1:
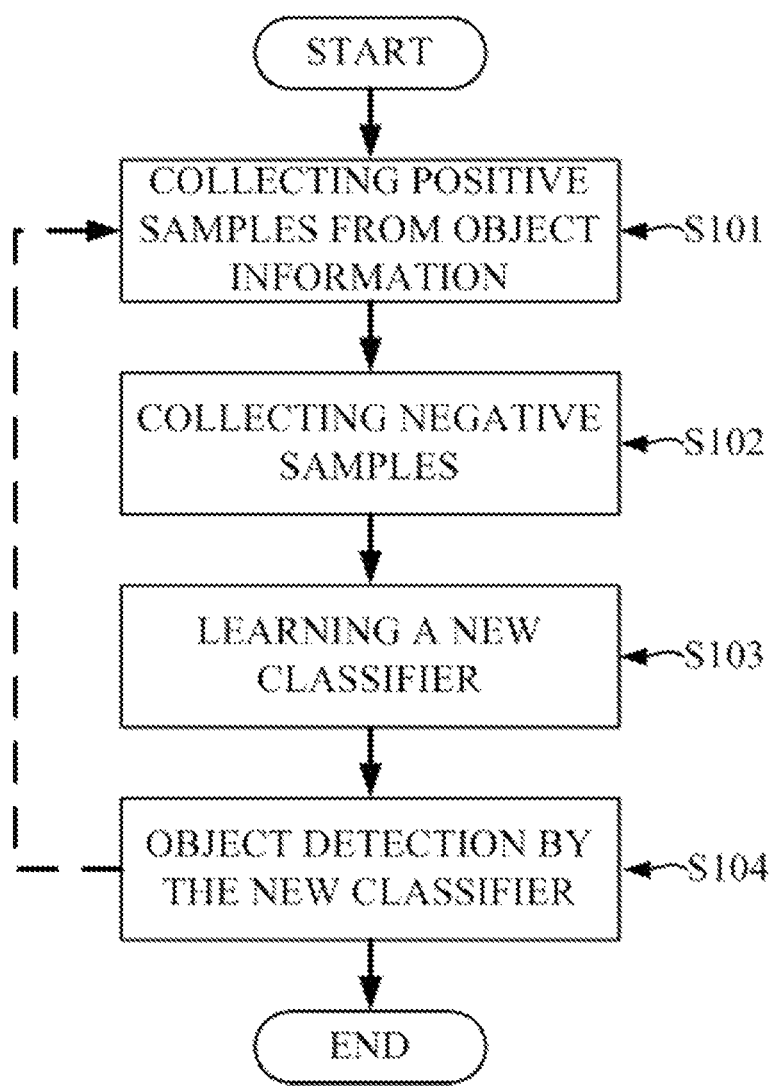
FIG. 1 illustrates a flowchart of an object detection method in the prior art.
Figure 2:
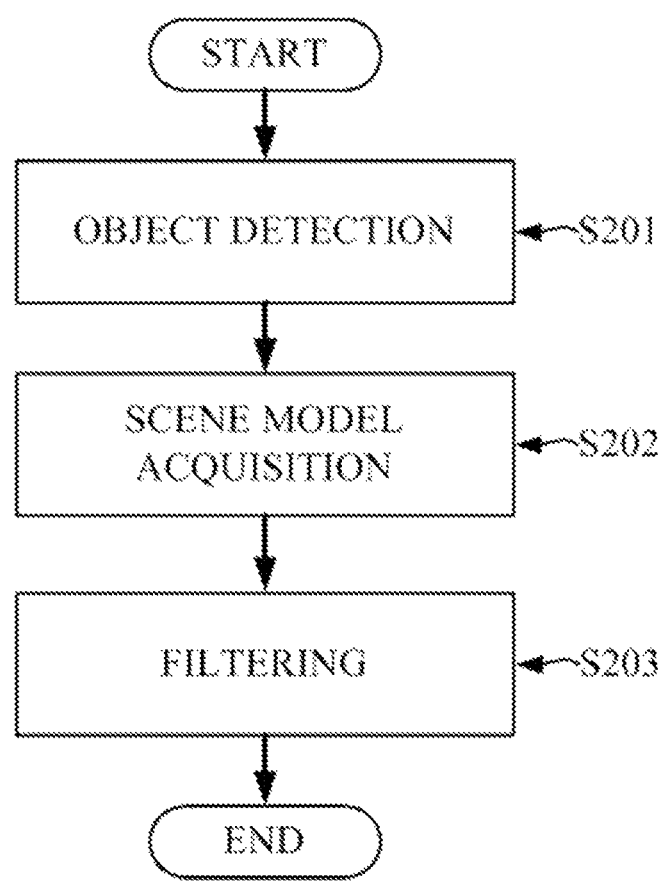
FIG. 2 illustrates a flowchart of an object detection method according to one mode of embodiment of the present application.

A flowchart for an object detection method in accordance with one mode of embodiment of the application is described with reference to FIG. 2 firstly. In the object detection method, a specific object is to be determined from a target image.

Step S201 is an object detection step in which the specific object is detected in the image by a specific object detector. The specific object detector may be a general detector for detecting the specific object, e.g., a person, in the image.

According to one embodiment, firstly, a plurality of regions is collected from the image or video including the image. For example, the collection of the plurality of regions may be achieved by using a sliding window method to sample various windows of the images in a multi-scale pyramid space. Such technologies as the sliding window and the multi-scale pyramid space have been able to be understood by those skilled in the art, so the description thereof is not repeated herein.

Then, for each window, one or more feature vectors are extracted from such plurality of regions by using the specific object detector, and scores of corresponding classifications are obtained. As a result, various windows are classified into the specific object or the background by the specific object detector.

Finally, all of the windows classified into the specific object are collected as the object detection result of this step.

Step S202 is a scene model acquisition step in which a scene model characterizing the background of the specific object in such images is acquired. The background may be deemed as a scene upon which the specific object is present.

Herein the image is divided into a specific object and a background or a specific scene for the sake of ease of description, the background or the specific scene excludes the specific object.

According to one embodiment, a scene model existing before the object detection step S201, such as the pixel-based model, e.g., the Gaussian mixture model (GMM), the feature-based model, e.g., the Boosting model, and the support vector machine-based model, etc., is acquired in this step.

According to another embodiment, a scene model created in advance for the background before the object detection step S201 is acquired in this step.

According to yet another embodiment, a scene model created for the background during the object detection step S201 is acquired in this step. Particularly, a scene model created for the first time for the background upon the start of the object detection step S201 is acquired in this step. This unit neither more samples are collected repeatedly nor the scene model is updated by using those samples after the scene model is created for the first time.

It is more accurate and efficient in the case of the latter two embodiments when the created scene models are used to identify the background, because the background is taken into account upon the creation of the scene model. The scene model acquisition process will be depicted in more detail hereinafter.

Step S203 is a filtering step in which the acquired scene model is used to filter the object detection result of the object detection step S201 to determine the specific object, that is, the acquired scene model is used to filter out the false detection result.

Therefore, according to the object detection method of the embodiment of the application, the background in the object detection result of the object detection step S201 may be identified more accurately and efficiently by using the acquired scene model without any repeated collection of the positive samples used for training the classifiers of the scene model, and the final specific object is determined, such that the accuracy of the present object detector is improved. The advantage may be better appreciated according to the detailed description hereinafter.

Figure 3A:
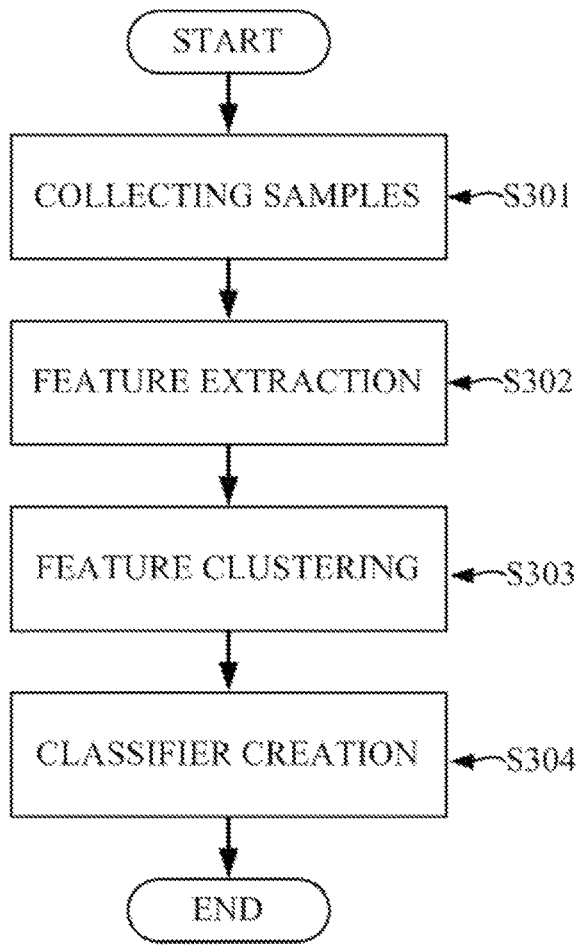
FIGS. 3A and 3B are a flowchart and a schematic diagram illustrating a scene model acquisition process according to one mode of embodiment of the application respectively.

A mode of embodiment of the scene model acquisition process in which only the background information is used to create the scene model is depicted with reference to the flowchart of FIG. 3A.

Step S301 is a sample collection step in which the regions exclude the specific object to be detected are collected from the images as the samples.

According to one embodiment, the acquired images or video frames may be divided into a plurality of image regions with different positions and dimensions upon the start of the specific object detection. The regions exclude the specific object to be detected in those image regions may be taken as the samples. For example, a plurality of image regions may be labelled as the samples on those images or video frames manually by a user. Alternatively, the regions as the background provided by the object detector may be used.

According to another embodiment, the samples are collected from the background information before the start of the detection. Specifically, the images or the video frames containing the similar backgrounds are prepared in advance, and then the images or the video frames are divided into the plurality of image regions with different positions and dimensions. The regions exclude the specific object to be detected in those image regions may be taken as the samples. For example, a plurality of image regions may be labelled as the samples on those images or video frames manually by a user. Alternatively, the regions as the background provided by the object detector may be used.

Preferably, the images or the video frames containing only the backgrounds are prepared in advance. Those image regions do not include the specific object to be detected, so those image regions may be all taken as the samples. In this way, an adequate number of samples may be provided, such that the background can be characterized more accurately.

Step S302 is a feature extraction step in which one or more first negative feature vectors are extracted from the samples.

In this step, any feature and feature extraction method characterizing the image regions of the samples effectively may be used. For example, the Histograms of Oriented Gradients (HOG) for human detection, the Scale-Invariant Feature Transform (SIFT), the Speeded Up Robust Feature (SURF), and the Local Binary Patterns (LBP), etc., may be used. It shall be appreciated that such features or extraction methods are merely examples rather than limitation, despite the illustration thereof is made herein.

Step S303 is a feature clustering step in which the one or more first negative feature vectors are clustered into a plurality of feature groups.

The object of clustering is to divided those first negative feature vectors into the plurality of feature groups, such that all feature vectors in each feature group are guaranteed to surround a specific centre. The feature vectors in the same feature group may be similar to each other, but may not be similar to the feature vectors in other feature groups.

Many clustering methods, such as the k-means, the k-medoids, may be used. It shall be understood that these methods are merely example rather than limitation.

Step S304 is a classifier creation step in which a first classifier is created for each feature group of a plurality of feature groups, and those first classifiers are combined to create the scene model.

Any classifier learning method may be used herein. According to one embodiment, the first classifier may be a one-class classifier, and the detailed description is made by taking the Support Vector Domain Description method (SVDD) as an example below, however, it is appreciated that it is merely an example rather that limitation.

The SVDD method intends to obtain a spheral boundary as follows: a minimal area is defined by the spheral boundary, so that the sphere defined by the boundary includes as many samples as possible. Such sphere may be characterized by the centre c and the radius R. The minimization of the spheral region is achieved by the expression below:

$$\min R^2 + C\Sigma_i \xi_i \ s.t. \|x_i - c\| \leq R^2 + \xi_i \text{ and } \xi_i \geq 0 \quad (1)$$

where C is the penalty factor, and $\xi i$ is the slack error.

Next, using the Lagrangian Multiplier, the expression below may be obtained:

$$\min \Sigma_{i,j} \alpha_i \alpha_j K(x_i \cdot x_j) - \Sigma_i \alpha_i K(x_i \cdot x_i) \ s.t.$$
$$0 \leq \alpha_i \leq C \text{ 且 } \Sigma_i \alpha_i = 1 \quad (2)$$

Where $\alpha_i$ is a factor of the support vector $x_i \in SVs$, $K(\cdot)$ is the kernel function. S.t. indicates the connotation in which the following constraint conditions are satisfied. In that method, the Histogram intersection Kernel (HIK) is selected preferably by the kernel function. The HIK function may be expressed as:

$$K_{HI}(x, y) = \sum_{i=1}^{N} \min(x_i, y_i) \quad (3)$$

The radius R of the sphere may be obtained by the following expression:

$$R^2 = K(x, x) - 2 \sum_{x_i \in SVs} \alpha_i K(x_i, x) + \sum_{x_i \in SVs} \sum_{x_j \in SVs} \alpha_i \alpha_j K(x_i, x_j) \quad (4)$$

Where x is any one of the support vectors.

For the unknown sample z, the distance to the centre of the sphere may be calculated by the expression below:

$$f(z) = R_z^2 \qquad (5)$$
$$= K(z, z) - 2 \sum_{x_i \in SVs} \alpha_i K(x_i, z) + \sum_{x_i \in SVs} \sum_{x_j \in SVs} \alpha_i \alpha_j K(x_i, x_j)$$

Next, it is judged that the sample z is inside of the hyper-sphere in a high-dimensional space and hence classified into a target object class if $f(z)=R_z^2 \leq R^2$.

Figure 3B:
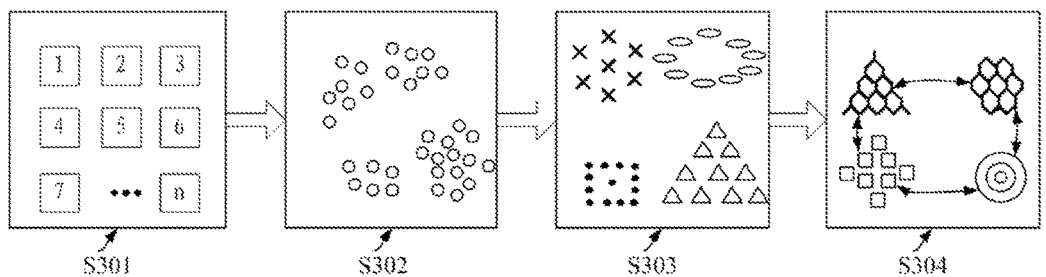

The schematic diagram of the scene model acquisition process according to the mode of embodiment of the application is illustrated in FIG. 3B, and the like reference numbers indicate the like steps hereinabove. It will be appreciated that the process can be better understood with reference to the schematic diagram which is not to be construed as the limitation of the application.

It can be seen from the steps above that neither the repeated collection of the positive samples, nor the repeated update of the scene model by usage of those positive samples is required, such that the creation of the scene model is simplified significantly, and filtering object detection result with such scene model will allow improving the accuracy of the specific object detection.

Figure 4A:
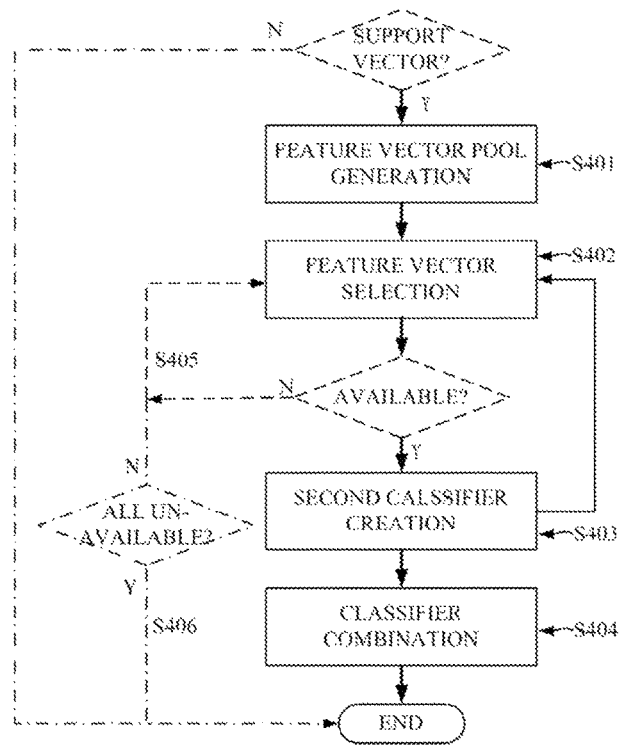
FIGS. 4A and 4B are a flowchart and a schematic diagram illustrating the scene model acquisition process according to another mode of embodiment of the application respectively.

Another mode of embodiment of the scene model acquisition process is illustrated in the flowchart in FIG. 4A. The difference between this mode and that illustrated in FIG. 3A lies in the classifier creation step, therefore such step will be depicted mainly, and the other identical or similar steps to those of the mode above is omitted.

In the case where the specific object detector is constituted of the support vectors, the scene model may be established by combining the specific object detector with the background information. The process described below may be carried out on the basis of the process described in FIG. 3A, and the process in FIG. 3A is omitted for the sake of conciseness, but it is not construed as inappropriate limitation to the temporal order for these steps.

Step S401 is a feature vector pool generation step in which a feature vector pool containing one or more positive feature vectors and second negative feature vectors is generated according to a specific object detector.

As an example, the specific object detector constituted of one or more support vectors is used to obtain the one or more positive feature vectors and second negative feature vectors upon the start of the specific object detection.

According to another example, the specific object detector constituted of the support vectors is used before the start of the specific object detection, so as to obtain the one or more positive feature vectors and second negative feature vectors.

According to one embodiment, the positive support vectors and the negative support vectors of the specific object detector may be used respectively as the one or more positive feature vectors and the one or more second negative feature vectors. The positive support vectors are stored in the feature vector pool as the positive feature vectors, and the negative support vectors are stored in the feature vector pool as the second negative feature vectors.

Therefore, the feature vector pool includes a set of positive feature vectors $X_{pos}$ and a set of second negative feature vectors $X_{neg}$.

Preferably, the feature vector pool has the maximum sizes for the positive feature vectors and the second negative feature vectors respectively. If the total number of certain kind of feature vector exceeds the maximum size, some feature vectors of such feature vectors are removed.

Step S402 is a feature vector selection step in which the positive feature vectors and the second negative feature vectors are selected from the feature vector pool as the candidates with respect to each feature group associated with the background, which is each feature group obtained after the feature clustering step S303 in FIG. 3A.

Figure 5:
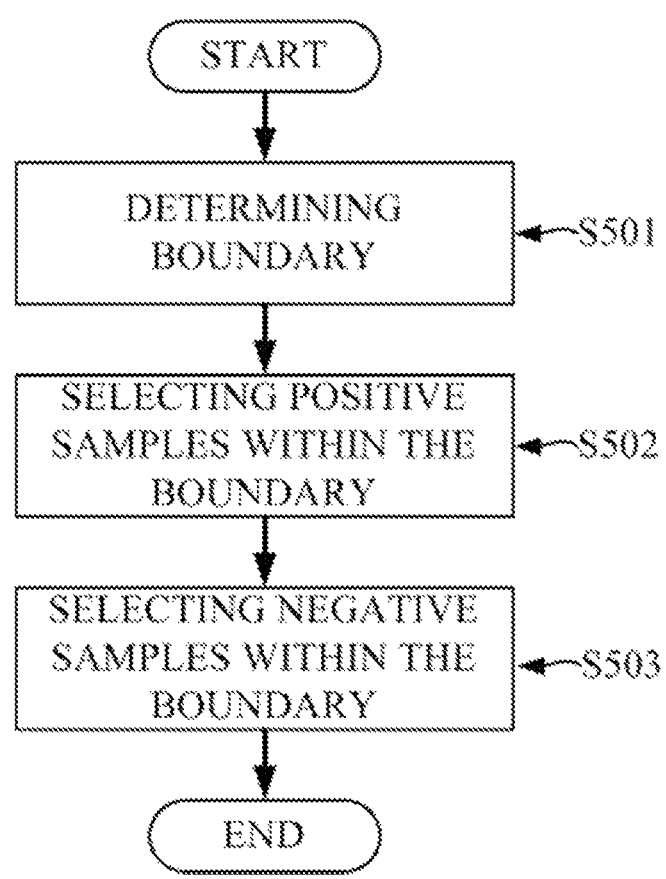
FIG. 5 illustrates a flowchart of one embodiment of the feature vector selection step in FIG. 4A.

FIG. 5 illustrates the flowchart of one embodiment of the feature vector selection step.

In step S501, the boundary of each feature group is determined in the feature space of the first negative feature vectors.

For each feature group associated with the background, the centre of that feature group may be obtained according to expression (1)-(3). Afterwards, a predetermined threshold may be set as the boundary of feature group. Such threshold may be like an empiric value for the radius R obtained in the step S304. Alternatively, a range of radius including percentage of the feature vectors in the feature group, e.g., more than 90% of the feature vectors, may also be specified to be the boundary.

After the boundary of each feature group is determined, in step S502, the positive feature vectors falling within the boundary of that feature group are selected from the feature vector pool.

After the positive feature vector are selected, in step S503, the second negative feature vectors falling within the boundary of that feature group are selected from the feature vector pool. The positive feature vectors are selection at first herein, however, it is appreciated the sequence is merely illustration rather than limitation.

In steps S502 and S503, for each feature group, the distances from respective feature vectors in the feature vector pool to the centre of that feature group may be calculated according to the expressions (4)-(5). If the distances are less than the threshold above, it is deemed that the corresponding feature vectors fall within the boundary of that feature group and are selected to be the candidate feature vectors for that feature group.

The description will come back to FIG. 4A next. Step S403 is a binary classifiers creation step in which a binary classifier is created with respect to each feature group associated with the background according to the candidates from the feature vector pool and that feature group.

For each feature group associated with the background, all feature vectors in that feature group and the second negative feature vectors selected in step S503 are considered to be the negative training samples, and the positive feature vectors selected in step S502 are considered to be the positive training samples. A support vector machine method may be used to train a second classifier based on the positive and negative support vectors, and the positive and negative support vectors are selected by a SVM training process.

For different feature groups, steps 402 and 403 are performed repeatedly to create the corresponding second classifiers.

According to one embodiment, the second classifiers may be the binary classifiers.

According to yet another embodiment, in the case where a predetermined number of candidates cannot be selected with respect to certain feature group in the feature vector selection step S402, the creation of the second classifier for that feature group will not be performed. In that case, the creation of the second classifier is proceeded to be carried out for the next feature group, as illustrated by the dashed line indicated by the label 405 in FIG. 4. Particularly, if it is the case where any candidate is not selected in the feature vector selection step S402, the first classifiers may be created by only the feature groups, as illustrated by the dot line indicated by the label 406 in FIG. 4.

Step S404 is a classifiers combination step in which the second classifiers are further combined to create the scene model.

Preferably, a cascaded structure is used. It indicates an unknown image region is classified into the background only if the unknown image region is considered to be the background by all classifiers of the first and second classifiers. In that way, the accuracy of background judgment may be improved.

It can be seen from the above steps that only the existing feature vectors of the specific object classifiers are used in the scene model acquisition process according to the embodiment, therefore, neither a repeated collection of the positive samples is required, nor a repeated updating of the scene model by using those positive samples is required, such that the creation of the scene model is significantly simplified, and filtering object detection result by use of such scene model will also allow improving the accuracy of the object detection.

Figure 4B:
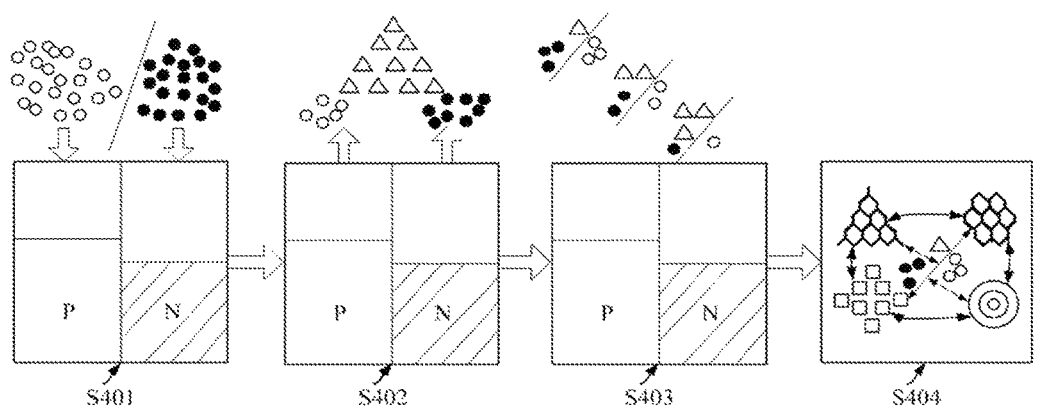

The schematic diagram of the scene model acquisition process according to the mode of embodiment of the application is illustrated in FIG. 4B, and like reference numbers indicate like steps above. It will also be appreciated that the process can be understood with reference to the schematic diagram which is not to be construed as the limitation of the application.

Figure 6:
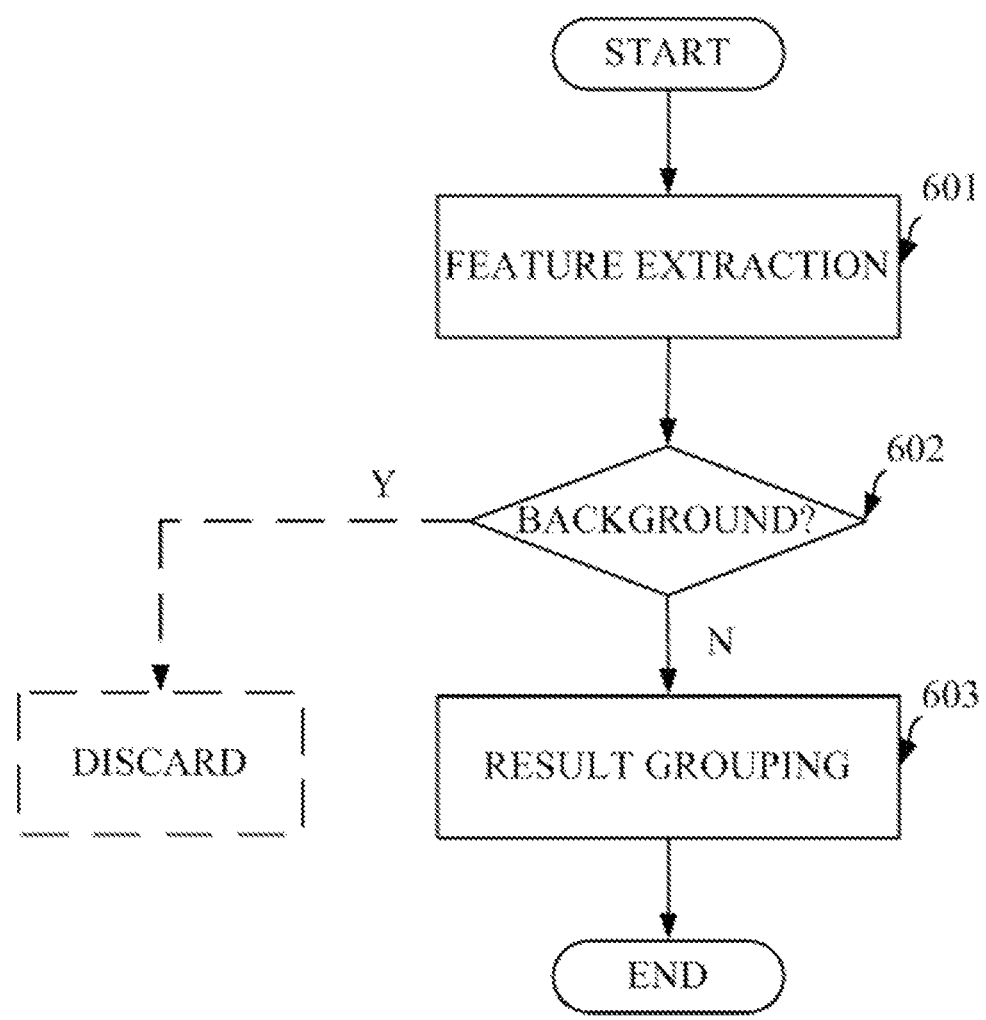
FIG. 6 illustrates a flowchart of one mode of embodiment of a filtering step.

The description will come back to FIG. 2 again hereinafter. For a filtering step S203, the flowchart of one mode of embodiment thereof is illustrated in FIG. 6.

Step S601 is a feature extraction step in which one or more feature vectors are extracted from the object detection result. As described in the step S302 above, any feature and feature extraction method characterizing the object detection result effectively may be used. For example, the Orientation the Histograms of Oriented Gradients (HOG) for human detection, the Scale-Invariant Feature Transform (SIFT), the Speeded Up Robust Feature (SURF), and the Local Binary Patterns (LBP), etc., may be used. Those features and feature extraction methods are merely illustration rather than limitation.

Step S602 is a judgment step in which the acquired scene model is used to judge whether the extracted feature vectors characterize the background.

As described above, the scene model includes a plurality of classifiers for performing the judgment of the background. Different scene models may have different methods for judgment.

According to one embodiment, the judgment is performed based on a weighted model. First, each classifier captured in the scene model is used to judge the extracted feature vectors to obtain respective judgment scores. Next, a weighted sum of the judgment scores is obtained as the final score of the scene model:

$$Score_{final} = \sum_i w_i \times score_i > threshold.$$

Where $w_i$ is the weight of each classifier, $score_i$ is the judgment score output from each classifier. If the final score is greater than a threshold, the object detection result is judged to be the background, and may be discarded, for example; otherwise, it is considered to be the specific object.

According to another embodiment, the judgment is performed based on a cascaded model. That is, if the extracted feature vectors are judged to be characterizing the background by all classifiers in the acquired scene model, the object detection result is considered to be the background and may be discarded, for example.

Step S603 is a result grouping step in which the object detection results corresponding to the feature vectors judged to be not characterizing the background are grouped into the final object detection results.

It can be appreciated by the detailed description that in the object detection method according to the present application, the acquired scene model may be used to identify the background in the object detection results of the specific object detector and obtain the final specific object more accurately and efficiently without a repeated collection of the positive samples used for training the classifiers, such that the accuracy of the specific object detector is improved.

Figure 7:
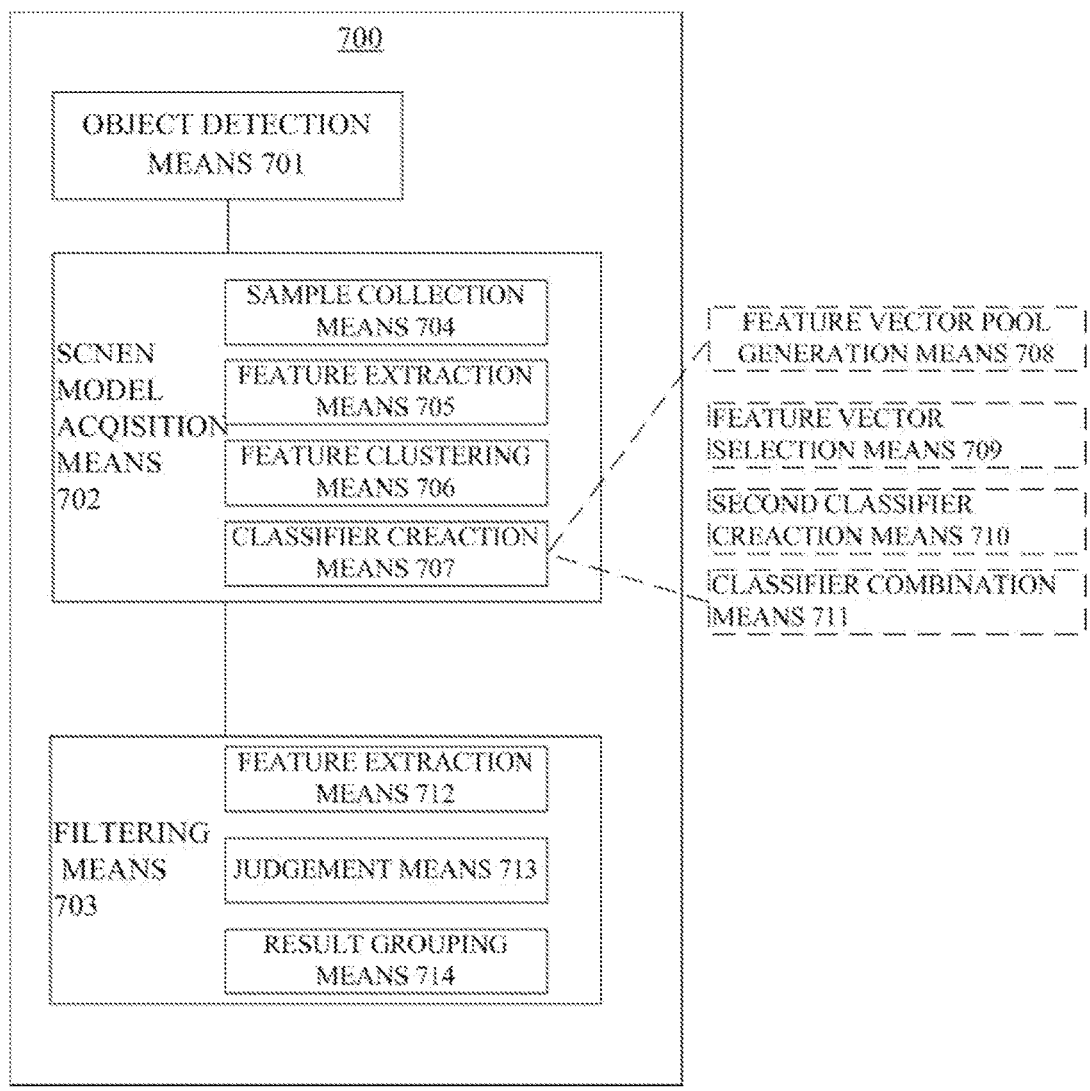
FIG. 7 illustrates a block diagram of an exemplary configuration of an object detection device according to one mode of embodiment of the application.

Next, the block diagram of the exemplary configuration of object detection device 700 according to one mode of embodiment of the application is described with reference to FIG. 7. The object detection device 700 comprises an object detection means 701 configured to detect a specific object in an image by a specific object detector; a scene model acquisition means 702 configured to acquire a scene model characterizing a background of the specific object in the image; and a filtering means 703 configured to filter one or more object detection results of the object detection means by the scene model to determine the specific object.

Means 701, 702, and 703 may be configured to perform the steps 201, 202, and 203, respectively.

According to an exemplary embodiment, the scene model acquisition means 702 may be configured to acquire the scene model created with respect to the background during the object detection. Additionally, the scene model acquisition means may be configured to acquire the scene model created in advance with respect to the background before the object detection. Furthermore, the scene model acquisition means may be configured to acquire the scene model existing before the object detection.

According to an exemplary embodiment, the scene model acquisition means 702 may comprise a sample collection means 704 configured to collect from the image one or more regions exclude the specific object to be detected as the samples; a feature extraction means 705 configured to extract first negative feature vectors from the samples; a feature clustering means 706 configured to cluster the first negative feature vectors into a plurality of feature groups; and a classifier creation means 707 configured to create a first classifier with respect to each feature group of the plurality of feature group and combine those first classifiers to create the scene model.

For example, the first classifiers may be one-class classifier.

According to an exemplary embodiment, in the case where the specific object detector is constituted of support vectors, the classifier creation means 707 may further comprise a feature vector pool generation means 708 configured to generate a feature vector pool containing one or more positive feature vectors and second negative feature vectors according to the specific object detector; a feature vector selection means 709 configured to select one or more positive feature vectors and second negative feature vectors as candidates from the feature vector pool with respect to each feature group associated with the background; a second classifier creation means 710 configured to create a second classifier according to the candidates from the feature vector pool and that feature group with respect to each feature group associated with the background; and a classifiers combination means 711 configured to create the scene model by further combining the second classifiers.

For example, the second classifiers may be binary classifier.

According to an exemplary embodiment, the feature vector pool may have maximum sizes used for the positive feature vectors and second negative feature vectors respectively, and the feature vector pool generation means 708 may further comprise the following means (not illustrated): means configured to use the positive support vectors in the specific object detector as the positive feature vectors; means configured to use the negative support vectors in the specific object detector as the second negative feature vectors.

According to an exemplary embodiment, the feature vector selection means 709 may further comprise the following means (not illustrated): means configured to determine a boundary of each feature group in a feature space of the first negative feature vectors; means configured to select the positive feature vector falling within the boundary of the feature group from the feature vector pool; and means configured to select the second negative feature vectors falling within the boundary of the feature group from the feature vector pool.

According to a possible embodiment, the object detection device 700 may further comprise means configured to in the case where the feature vector selection means 709 cannot select the predetermined number of candidates with respect to certain feature group (not illustrated) perform no creation of the second classifier for that feature group.

According to an exemplary embodiment, the filtering means may comprise a feature extraction means 712 configured to extract feature vectors from the object detection results; a judgement means 713 configured to judge whether the extracted feature vectors characterize the background by the scene model, and a result grouping means 714 configured to group the object detection results corresponding to the feature vectors judged not to be characterizing the background into the final object detection results.

According to one possible embodiment, the judgment means 713 may further comprise the following means (not illustrated): means configured to judge the extracted feature vectors by each classifier in the scene model; means configured to obtain a weighted sum of the scores of the judgment; means configured to judge the object detection result to be characterizing the background if the weighted sum is greater than a threshold.

According to another possible embodiment, the judgment means 713 may further comprise the following means (not illustrated): means configured to judge the extracted feature vectors by each classifier in the scene model; means configured to judge the object detection result as the background if all judgment results indicate that the extracted feature vectors characterizes the background.

The means described above and means to be described below are exemplary and/or preferable modules for implementing the process described in the present disclosure. The modules can be hardware units (such as a field programmable gate array, a digital signal processor, an application specific integrated circuit or the like) and/or software modules (such as a computer readable program). The modules for implementing the various steps are not described exhaustively above. However, where there is a step of performing a certain process, there may be a corresponding functional module or means (implemented by hardware and/or software) for implementing the same process. Technical solutions defined by all combinations of steps described and means corresponding to these steps are included in the disclosure of the present application, as long as the technical solutions they constitute are complete and applicable.

In addition, the above device constituted by various means may be merged into hardware means such as a computer as a functional module. Of course the computer may have other hardware or software elements in addition to these functional modules.

The object detection device according to the application never require to collect the positive samples for training the classifiers repeatedly, and may use the acquired scene model to identify the background in the object detection result of the specific object detector and obtain the final specific object more accurately and efficiently, such that the accuracy of the specific object detector is improved.

It is indicated by a test implemented on a computer system by the inventors that the object detection method of the application is capable of reducing the false alarm at least 5-8 times as compared with the prior art, as illustrated in Table 1 below.

TABLE 1

|  | Speed | Detect Rate | False Alarm Rate |
| --- | --- | --- | --- |
| Current object detector | 5.3 fps | 91.0% | 1.42% |
| Prior Art (with online learning) | 2.9 fps | 91.0% | 0.88% |
| Our method: mode of FIG. 3A (without online learning) | 4.9 fps | 91.0% | 0.18% |
| Our method: mode of FIG. 4A (without online learning) | 4.3 fps | 91.0% | 0.11% |

In table 1, the results obtained by using the general object detector, the object detection in prior art, and the object detection of the application are listed. In the test, for the detection rate, a PASCAL evaluation criteria is used, that is, when (an intersection between the labelled region and the detected region)/(the union between the labelled region and the detected region)>0.5, the detected region is considered to be the correct detection region. For the false alarm, the following criteria is employed: when an overlap ration of the detected region to the labelled real background is greater than certain threshold, or the detected region is present in a predetermined frame excludes the object, the detected region is considered to be one false alarm.

According to the application, the background in the object detection results of the specific object detector may be identified more accurately and efficiently by using the acquired scene model without any repeated collection of the positive samples for training the classifiers, and the final specific object is obtained, such that the accuracy of the specific object detector is improved.

Figure 8:
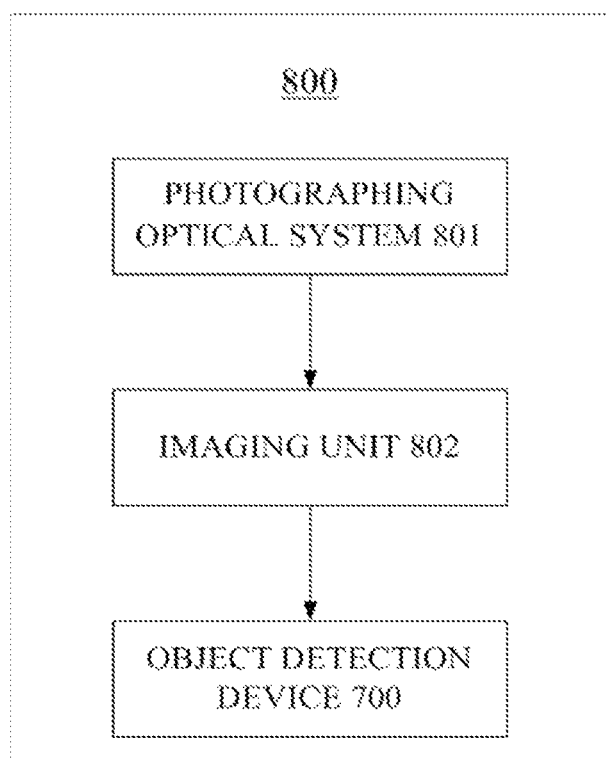
FIG. 8 illustrates a block diagram of an exemplary configuration of an image pickup device according to one mode of embodiment of the application.

The object detection device according to the application may have many applications. For example, it may be used for, but not limited to, an image pickup device. FIG. 8 is the block diagram of the exemplary configuration of the image pickup device 800 according to one mode of embodiment.

As illustrated in FIG. 8, the image pickup means 800 may comprise a photograph optical system 801 which may, for example, include an optical element for photographing; an imaging unit 802 configured to perform an imaging to form the image, the imaging unit 802 may include an imaging sensor such as a CCD sensor or a CMOS sensor; and the above object detection device 700 configured to detect the specific object in the formed image.

According to one embodiment, the image pickup device 800 comprising the object detection device 700 may implement an auto-focus more efficiently and accurately. After the specific object is determined by the object detection device 700, the auto-focus of the specific object is implemented by the image pickup device, such that a clearer image or video is obtained.

Figure 9:
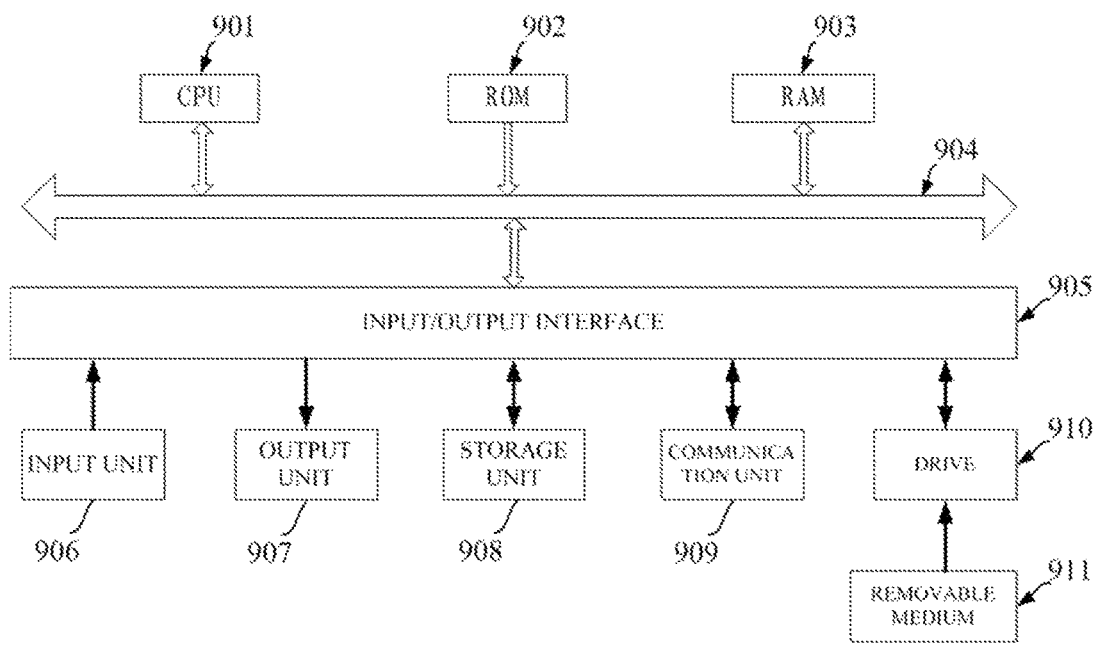
FIG. 9 illustrates a block diagram of a hardware configuration of a computer system in which the embodiments of the application may be implemented.

FIG. 9 is a block diagram illustrating the hardware configuration of the computer system in which the embodiments of the application may be implemented.

As shown in FIG. 9, the computer system comprises a processing unit 901, a read-only memory 902, a random access memory 903, an input/output interface 905, an input unit 906, an output unit 907, a storage unit 908, a communication unit 909, and a driver 910 connected via a system bus 904. The program may be recorded in advance in the ROM (read-only memory) 902 as the record medium built in the computer or the storage unit 908. Alternatively, the program may be stored (recorded) in a removable medium 911. Herein, the removable medium 911 comprises, for example, a floppy disc, a CD-ROM (compact disc-read only memory), an MO (magnetic-optical) disc, a DVD (digital versatile disc), a magnetic disc, a semiconductor memory, and so on.

The input unit 906 is configured with a keypad, a mouse, a microphone or the like. Further, the output unit 907 is configured with a liquid crystal display, speaker or the like.

Furthermore, the program may be downloaded on the computer through a communication network or a broadcast network so as to be installed into the built-in storage unit 908, in addition to the configuration in which the program is installed on the computer from the removable medium 911 mentioned above through the driver 910. In other words, the program may be transmitted to the computer, for example, in a wireless manner from the download site through a satellite for a digital satellite broadcast or in a wired manner through a network such as a LAN (local area network) or the internet, etc.

If an instruction is input via the input/output interface 905 through the user manipulation of the input unit 906, etc., CPU 901 will execute the program stored in the ROM 902 according to the instruction. Alternatively, CPU 901 loads a program stored in the storage unit 908 on the RAM 903 for executing the program.

Therefore, CPU 901 executes the processes according to the flowchart mentioned above or the processes executed by the configuration of the block diagram mentioned above. Next, if necessary, CPU 901 permits the processing results to be output for example from the output unit 907 via the input/output interface 905, transmitted via the communication unit 909, recorded in the storage unit 908 or the like.

In addition, a program can be executed by a computer (processor). Further, a program can be processed by plurality of computers in a distributed manner. Moreover, a program can be transmitted to a remote computer to be executed.

The computer system shown in FIG. 9 is merely illustrative but not intends to limit the present application and the use or application thereof.

The computer system shown in FIG. 9 can be implemented in any embodiment, functions as an individual computer, or functions as a processing system in an apparatus. One or more components can be removed from the computer system if unnecessary or added to the computer system as additional components.

It is possible to carry out the method and system of the present application in many ways. For example, it is possible to carry out the method and system of the present application through software, hardware, firmware or any combination thereof. The above described order of the steps of the method is only intended to be illustrative, and the steps of the method of the present application are not limited to the above specifically described order unless otherwise specifically stated. Besides, in some embodiments, the present application may also be embodied as programs recorded in recording medium, including machine-readable instructions for implementing the method according to the present application. Thus, the present application also covers the recording medium which stores the program for implementing the method according to the present application.

Although some specific embodiments of the present application have been described in detail with examples, it should be understood by a person skilled in the art that the above examples are only intended to be illustrative but not to limit the scope of the present application. It should be understood by a person skilled in the art that the above embodiments can be modified without departing from the scope and spirit of the present application. The scope of the present application is defined by the attached claims.

This application claims the benefit of Chinese Patent Application No. 201310365300.5 filed Aug. 21, 2013, which is hereby incorporated by reference herein in its entirety.

What is claimed is:

1. An object detection device comprising:
a memory which stores a program; and
a processor which executes the program stored in the memory to perform operations comprising:
detecting a specific object in an image captured by an image sensor;
generating a feature vector pool containing positive feature vectors and first negative feature vectors according to the detected specific object;
selecting the positive feature vectors and the first negative feature vectors as candidates from the feature vector pool for each feature group associated with the background in the image;
creating for each feature group associated with the background a first classifier according to the candidates from the feature vector pool and the feature group;
creating a scene model by determining classification results using the candidates of the first classifiers; and
filtering object detection results of the detected specific object using the classification results of the scene model to discard the background.

2. The object detection device, according to claim 1, wherein creating the scene model comprises:
collecting regions other than the specific object to be detected from the image as samples;
extracting second negative feature vectors from the samples;
clustering second negative feature vectors into a plurality of feature groups; and
creating second classifiers each for respective one of the plurality of feature groups and to create the scene model by determining classification results of the second classifiers.

3. The object detection device according to claim 2, wherein creating the scene model further comprises creating the scene model during the detecting of the object.

4. The object detection device according to claim 2, wherein creating the scene model further comprises creating the scene model before the detecting of the object.

5. The object detection device according to claim 2, wherein the second classifier is a one-class classifier.

6. The object detection device according to claim 2, wherein filtering comprises:
extracting feature vectors from an object detection result;
judging whether the extracted feature vectors characterize the background by using the scene model; and
grouping the object detection result corresponding to the feature vectors judged as not characterizing the background into final object detection results.

7. The object detection device according to claim 6, wherein judging comprises:
judging the extracted feature vectors by using each classifier in the scene model;
obtaining a weighted sum of the scores of the judgment; and
judging the object detection result to be characterizing the background if the weighted sum is greater than a threshold.

8. The object detection device according to claim 6, wherein judging further comprises:
judging the extracted feature vectors by using each classifier in the scene model; and
judging the object detection result as the background if all judgment results indicate that the extracted feature vectors characterize the background.

9. The object detection device according to claim 1, wherein the first classifier is a binary classifier.

10. The object detection device according to claim 1, wherein the feature vector pool has maximum sizes for the positive feature vectors and the first negative feature vectors respectively, and generating further comprises:
using positive support vectors in the detecting of the specific object as the positive feature vectors;
using negative support vectors in the detecting of the specific object as the first negative feature vectors.

11. The object detection device according to claim 1, wherein selecting further comprises:
determining a boundary of the each feature group in a feature space of the second negative feature vectors;
selecting the positive feature vectors falling within the boundary of the feature group from the feature vector pool; and
selecting first negative feature vectors falling within the boundary of the feature group from the feature vector pool.

12. The object detection device according to claim 1, wherein the operations further comprises stopping the first classifier for the feature group in the case that the selecting is not capable of selecting a predetermined number of candidates for certain feature group.

13. An image pickup device, comprising:
an image processor configured to perform an imaging to obtain an image; and
the object detection device according to claim 1.

14. An object detection method, comprising:
detecting a specific object in an image captured by an image sensor;
generating a feature vector pool containing positive feature vectors and first negative feature vectors according to the detecting of the specific object;
selecting the positive feature vectors and the first negative feature vectors as candidates from the feature vector pool for each feature group associated with a background in the image;
creating for each feature group associated with the background a first classifier according to the candidates from the feature vector pool and the feature group;
creating a scene model by determining classification results using the candidates of the first classifiers; and
filtering object detection results of the detected specific object using the classification results of the scene model to discard the background.

15. A non-transitory storage medium storing a program for causing a computer to perform an object detection method, comprising:
detecting a specific object in an image captured by an image sensor;
generating a feature vector pool containing positive feature vectors and first negative feature vectors according to the detecting of the specific object;
selecting the positive feature vectors and the first negative feature vectors as candidates from the feature vector pool for each feature group associated with a background in the image;
creating for each feature group associated with the background a first classifier according to the candidates from the feature vector pool and the feature group;
creating a scene model by determining classification results using the candidates of the first classifiers; and
filtering object detection results of the detected specific object using the the classification results of the scene model to discard the background.

* * * * *